US005102345A

United States Patent [19]

Stanwick et al.

[11] Patent Number: 5,102,345

[45] Date of Patent: Apr. 7, 1992

[54] SAFETY DEVICE FOR ELECTRICAL CORD SOCKETS

[75] Inventors: Richard S. Stanwick; Trevor Maguire, both of Manitoba, Canada

[73] Assignee: University of Manitoba, Winnipeg, Canada

[21] Appl. No.: 712,498

[22] Filed: Jun. 10, 1991

[51] Int. Cl.[5] .................... H02H 3/16; H01R 13/66

[52] U.S. Cl. .................................... 439/181; 361/50; 361/178; 439/911

[58] Field of Search ......................... 439/92, 101-108, 439/86, 88-90, 181, 607, 608, 911; 361/42, 47, 49, 50, 118, 178; 307/326; 200/61.04

[56] References Cited

U.S. PATENT DOCUMENTS

| | | | |
|---|---|---|---|
| 3,686,534 | 8/1972 | Cook, Jr. | 361/178 |
| 3,728,581 | 4/1973 | Adamo | 361/50 |
| 4,568,133 | 2/1986 | Amano et al. | 439/181 |
| 4,688,135 | 8/1987 | Leopold | 439/622 |
| 4,751,603 | 6/1988 | Kwan | 361/50 |
| 5,013,891 | 5/1991 | Shoemaker | 361/42 |

*Primary Examiner*—Neil Abrams
*Attorney, Agent, or Firm*—Adrian D. Battison; Stanley G. Ade; Murray E. Thrift

[57] ABSTRACT

The present invention describes a safety device for a socket portion of an electrical cord. The safety feature involves the positioning of a conducting ring around the positive slot on the receiving socket. The conducting ring is grounded, and when used in conjunction with a ground fault interrupter, prevents the completion of an electrical circuit through the child's saliva from the positive contact in the socket and the flesh of the child's mouth.

6 Claims, 2 Drawing Sheets

SAFETY DEVICE FOR ELECTRICAL CORD SOCKETS

FIELD OF THE INVENTION

This invention relates to the field of electrical devices, more particularly to a safety device for the sockets of electrical cords.

BACKGROUND OF THE INVENTION

In recent years there have been many documented cases in which very young children have been badly burnt as a result of using a live extension cord socket as a teething aid. It is known that the burns are caused by the electrical current running through the cord. In most cases, the victim of these burns has required reconstructive surgery to repair the damage to the facial area surrounding the mouth.

The mechanism of this type of burn has not been the subject of a great deal of research as most research has been directed to the devastating injuries which can be sustained at voltages much higher than the household voltage of 115 volts. It has been determined by experiments carried out by the present inventors that the major cause of the burns is by resistive heating caused in the tissues by an electric current running through the child's saliva that has come into electrical contact with the hot or live terminal of the socket.

Saliva is a relatively good conductor, but at the relatively low household voltage, it has been determined that it takes approximately seven to eight seconds before tissue necrosis occurs. It is thought that the electrical current causes tetany, or a sustained clamping of the jaws, which prevents the child from letting go until the saliva within the socket is heated and boiled away. Unfortunately this occurs after the child has been injured.

Prior safety devices include sliding sleeves that cover the socket slot. These are not effective because saliva may still get through the gaps. These devices, along with other devices that cover or enter the socket slot, require an overt action on the part of the user. In many cases they are easily removed and they provide no protection for the type of injury described above.

SUMMARY OF THE INVENTION

It is an object of the present invention to provide a safe electrical cord socket that will prevent electrical burn injury, particularly to children.

The present invention therefore provides an electrical extension cord comprising an electrical cable having a first conductor for connecting to a live electrical supply, second conductor for connection to a neutral return and a third conductor for connection to ground, a socket portion connected to said electrical cable and having a receiving surface defining three openings therein and means to receive the conventional pins of a household electrical plug, each of said openings having a contact terminal therein for engaging a respective one of the pins of the plug and arranged for connection to a respective one of the conductors, a conductive member mounted on the surface so as to substantially surround that one of the openings which has the contact terminal thereof arranged for connection to said live electrical supply with the conductive member exposed at the surface for electrical connection to any saliva running across the surface towards said one of the openings, the conductive member closely surrounding said one of the openings and so as to surround only said one of the openings, and means connecting the conductive member to said third conductor for connection to ground.

The present invention is long lasting, inexpensive and simple in design and construction when used in combination with the ground fault interrupter, it provides a safety device that will decrease electrical burn injury in young children.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
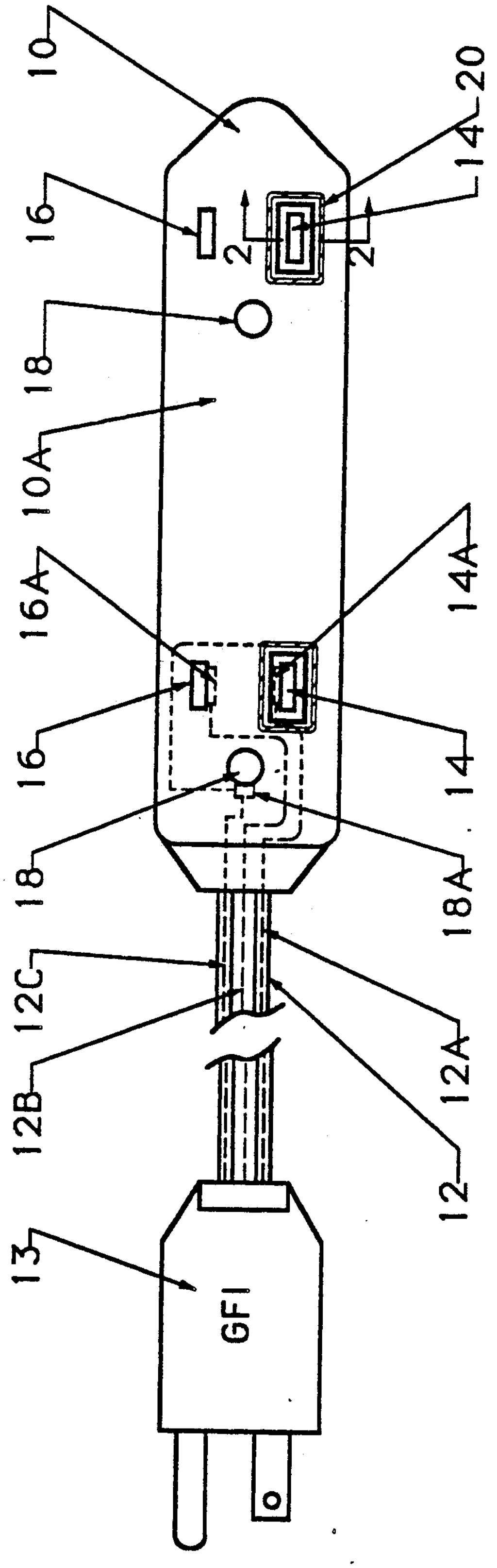
FIG. 1 is a top view of one embodiment of this invention.

The extension cord according to the present invention is shown in FIG. 1 and includes a socket body generally indicated at 10 which is connected in conventional manner to a wire 12 and through the wire to a plug 13 for connection to an electrical supply. The socket body 10 includes an upper flat surface 10A on which is defined a plurality of openings for receiving the conventional pins of a plug connector of a type for attachment to the conventional household socket. The openings are defined in two sets, each for receiving a respective plug connector. Each set of the openings includes a first slot shaped opening 14 having a contact terminal schematically indicated at 14A connected to a first conductor 12A of the cable. The openings further include a second slot shaped opening 16 again having a contact terminal 16A connected to a second conductor 12B of the wire. Furthermore there is provided a circular third opening 18 having a contact terminal 18A connected to a third conductor 12C of the wire. The contact terminal 14A is arranged for connection to the live electrical supply to define the "hot" or live terminal of the socket. The contact terminal 16A is arranged for connection to the neutral return. The contact terminal 18A is arranged for connection to the ground circuit of the building within which the device is located.

Figure 3:
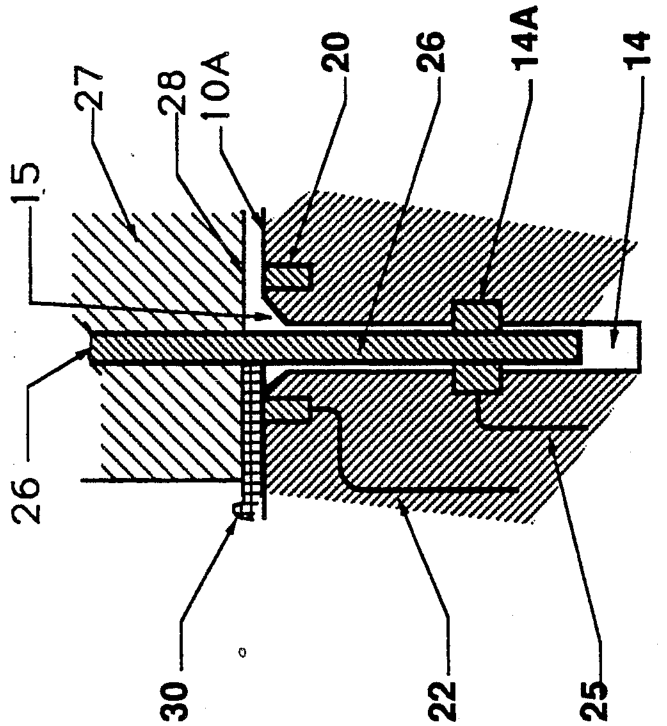
FIG. 3 is a cross sectional view similar to that of FIG. 2 showing an attached electrical plug.
Figure 2:
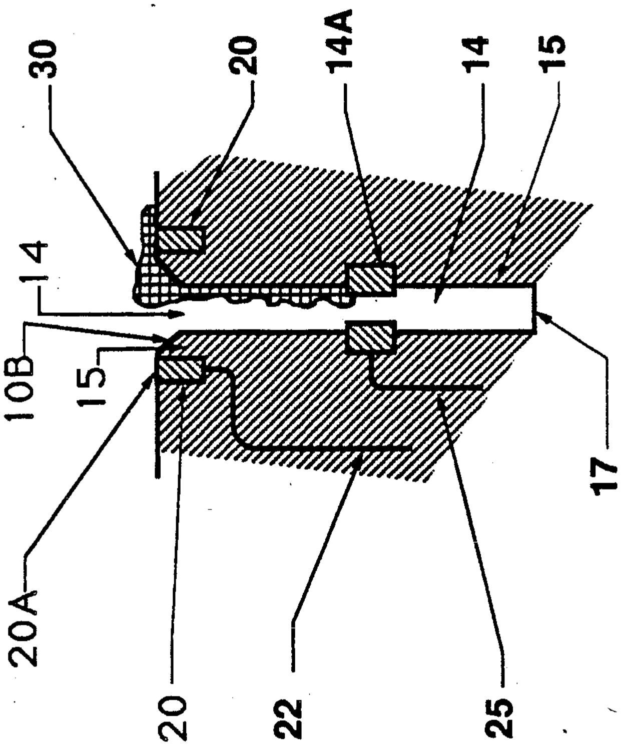
FIG. 2 is a cross sectional view along the lines 2—2 of the embodiment of FIG. 1.

In FIGS. 2 and 3 is shown one of the openings 14 in cross section. The opening includes a channel 15 extending from the open mouth 14 down to a base 17 within the body of the socket. The channel surface is defined by the insulated material of the socket body. At one point along the length of the channel is defined the terminal 14A which is shown schematically as an annular element surrounding the channel and having an inside surface projecting into the channel for engagement with a pin 26 of a conventional plug connector. The plug connector includes a body 27 having a front surface 28 which moves, in a connected position of the plug connector to a position closely adjacent the top surface 10A of the socket body. The pin 26 comprises a metal pin which extends from the insulating material of the connector body 27 into the channel 15.

Basically the construction described above is a conventional arrangement readily available and widely used. The conventional arrangement is modified by the addition of a conductive member 20 which is embedded within the upper surface 10A of the socket body so as to define an uppermost surface 20A of the conductive member which lies flush with the surface 10A but is exposed at the surface 10A for electrical connection to any member contacting that uppermost surface. The conductive member 20 is however spaced from the channel 15 so that there is a ring of insulating material 10B between the inside edge of the conductive member 20 and the mouth 14 of the channel 15. There is no possibility of the pin 26 coming into engagement with the conductive member while the pin is placed into the channel and in engagement with the contact 14A. Of course it is possible for the pin 26 while it is outside the channel 15 to engage the conductive member 20 but at this stage there is no connection to the live terminal 14A and hence no flow of electricity. The conductive member 20 fully surrounds the channel 14 and hence the terminal 14A but is inside the other openings 18 and 16 and spaced therefrom.

As shown schematically in FIG. 1, the connector plug 13 is of the ground fault interrupter (GFI) type which are commercially available and provide the ground fault interruption circuit within the plug connector itself. As is well known the ground fault interrupter circuit acts to detect the flow of current through the ground connection and upon detection of such flow acts to disconnect the live electrical supply through the connector. This ensures that upon detection of a fault in which the current is bypassed to the ground, the current is immediately cut off to prevent electrocution.

The conductor member 20 is connected through a wire 22 to the ground conductor 12C of the wire 12 and thus to the ground connector of the GFI circuit within the plug 13.

In use, the electrical extension cord is plugged into a wall socket. Should a child pick up and suck or chew on the socket end of the cord, there is a very real possibility that the saliva 30 will enter the positive slot 14 of the socket 10. The saliva 30 is a well known electrical conducting material. Its conductivity is estimated to be between 0.5 to 1 siemems-per-meter, and as such is a good conductor for electrical current into a person's flesh. Even if there is a plug within the socket, as shown in FIG. 3, the saliva 30 may still penetrate the gaps and complete the circuit with the hot contact 14A within the slot 14 of the socket 10.

Should saliva enter the hot slot 14 and make contact with the hot contact 14A, there is a resulting current running through the saliva to the mouth of the child from the hot contact 14A.

By placing the conducting ring 20 around the edge 15 of the hot slot 14, the saliva must come in contact with the exposed ring 20 before its subsequent contact with the hot contact 14A within the slot 14. The contact of the saliva 30 with the hot contact 14A will result in a current of approximately 50 mA. As most ground fault interrupters are set to trip at 5 mA, there is more than enough current running from the contact 14A to the ring 20 to interrupt the circuit and prevent injury to the child.

It is noted that the system is to be used in combination with ground fault interrupters of a normal household panelboard or other ground fault interrupter system, such as an attached wall unit.

The cause of electrical burns to the mouth area of children, as a result of chewing on the end of an extension cord, is not arcing, but rather the resistive heating of the current passing through the flesh, which takes some time to develop.

The heating of flesh by electrical current (typically 50 mA) is quite slow: about 5° C. per second. Consequently, the onset of a third degree burn at about 70° C. (necrosis temperature) takes about seven seconds to occur. It is postulated that tetany causes the child to not let go when he/she feels the tingling sensation of the alternating current. The present invention will overcome these problems by providing a means to interrupt the circuit between the hot contact 24 and the child's mouth before any damage to the tissue has occurred.

Since various modifications can be made in my invention as hereinabove described, and many apparently widely different embodiments of same made within the spirit and scope, it is intended that all matter contained in the accompanying specification shall be interpreted as illustrative only and not in a limiting sense.

We claim:

1. An electrical extension cord comprising an electrical cable having a first conductor for connecting to a live electrical supply, second conductor for connection to a neutral return and a third conductor for connection to ground, a socket portion connected to said electrical cable and having a receiving surface defining three openings therein and means to receive the conventional pins of a household electrical plug, each of said openings having a contact terminal therein for engaging a respective one of the pins of the plug and arranged for connection to a respective one of the conductors, a conductive member mounted on the surface so as to substantially surround that one of the openings which has the contact terminal thereof arranged for connection to said live electrical supply with the conductive member exposed at the surface for electrical connection to any saliva running across the surface towards said one of the openings, the conductive member closely surrounding said one of the openings and so as to surround only said one of the openings, and means connecting the conductive member to said third conductor for connection to ground.

2. The extension cord according to claim 1 wherein the conductive member has a surface thereof substantially flush with the receiving surface.

3. The extension cord according to claim 1 wherein the conductive member fully surrounds said one of the openings.

4. The extension cord according to claim 1 wherein the conductive member is spaced from said contact terminal of said one of the openings by insulating material forming a part of the socket portion and is spaced from the other of the openings by the insulating material forming a part of said socket portion.

5. The extension cord according to claim 1 wherein said one of the openings comprises a mouth of a channel extending into the socket portion, the conductive member being spaced outwardly from the opening such that the mouth of the channel is spaced from the conductive member.

6. The extension cord according to claim 1 wherein the electrical cable is connected to an electrical supply outlet including a live electrical supply connector, a neutral return connector and a ground connector and including a ground fault interrupter circuit responsive to flow of current through said ground connector to disconnect said live electrical supply.

* * * * *

UNITED STATES PATENT AND TRADEMARK OFFICE
CERTIFICATE OF CORRECTION

PATENT NO. : 5,102,345

DATED : April 7, 1992

INVENTOR(S) : GLENN W. SWIFT, RICHARD S. STANWICK and TREVOR MAGUIRE

It is certified that error appears in the above-identified patent and that said Letters Patent is hereby corrected as shown below:

Title page, item (75):

The inventors names should be corrected to read:

GLENN W. SWIFT, RICHARD S. STANWICK and TREVOR MAGUIRE, all of Manitoba, Canada.

Signed and Sealed this

Sixth Day of July, 1993

Attest:

Michael K. Kirk

MICHAEL K. KIRK

Attesting Officer

*Acting Commissioner of Patents and Trademarks*